United States Patent
Yu et al.

(10) Patent No.: US 12,454,611 B2
(45) Date of Patent: Oct. 28, 2025

(54) PREPOLYMER, RESIN COMPOSITION COMPRISING THE SAME AND ARTICLE MADE THEREFROM

(71) Applicant: Elite Material Co., Ltd., Taoyuan (TW)

(72) Inventors: Yi-Fei Yu, Taoyuan (TW); Ching-Huan Lee, Taoyuan (TW); Chen-Yu Hsieh, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 476 days.

(21) Appl. No.: 18/193,854

(22) Filed: Mar. 31, 2023

(65) Prior Publication Data

US 2024/0294745 A1 Sep. 5, 2024

(30) Foreign Application Priority Data

Mar. 1, 2023 (TW) .................................. 112107184

(51) Int. Cl.
| | |
|---|---|
| C08L 51/00 | (2006.01) |
| C08F 232/08 | (2006.01) |
| C08F 236/20 | (2006.01) |
| C08F 279/00 | (2006.01) |
| C08J 5/24 | (2006.01) |
| C08L 45/00 | (2006.01) |

(52) U.S. Cl.
CPC .......... C08L 51/003 (2013.01); C08F 232/08 (2013.01); C08F 236/20 (2013.01); C08F 279/00 (2013.01); C08J 5/244 (2021.05); C08L 45/00 (2013.01); C08J 2351/00 (2013.01); C08J 2471/12 (2013.01)

(58) Field of Classification Search
CPC ...... C08L 45/00; C08L 51/003; C08F 255/00; C08F 36/20; C08F 32/08; C08F 232/08; C08F 236/20; C08F 279/00
See application file for complete search history.

(56) References Cited

FOREIGN PATENT DOCUMENTS

EP 0292153 A2 * 11/1988 .............. C08L 23/02

\* cited by examiner

*Primary Examiner* — Kregg T Brooks
(74) *Attorney, Agent, or Firm* — MUNCY, GEISSLER, OLDS & LOWE, P.C.

(57) ABSTRACT

A prepolymer and a resin composition containing the prepolymer are provided. The prepolymer is obtained from a prepolymerization reaction of a mixture, the mixture at least including dicyclopentadiene-ethylidenenorbornene copolymer and acenaphthylene in a weight ratio of between 1:1 and 5:1. The resin composition may be used to make various articles, including a resin film, a prepreg, a laminate or a printed circuit board, and at least one of the following properties can be improved, including dielectric constant, dissipation factor, copper foil peeling strength, X-axis coefficient of thermal expansion and glass transition temperature.

8 Claims, 1 Drawing Sheet

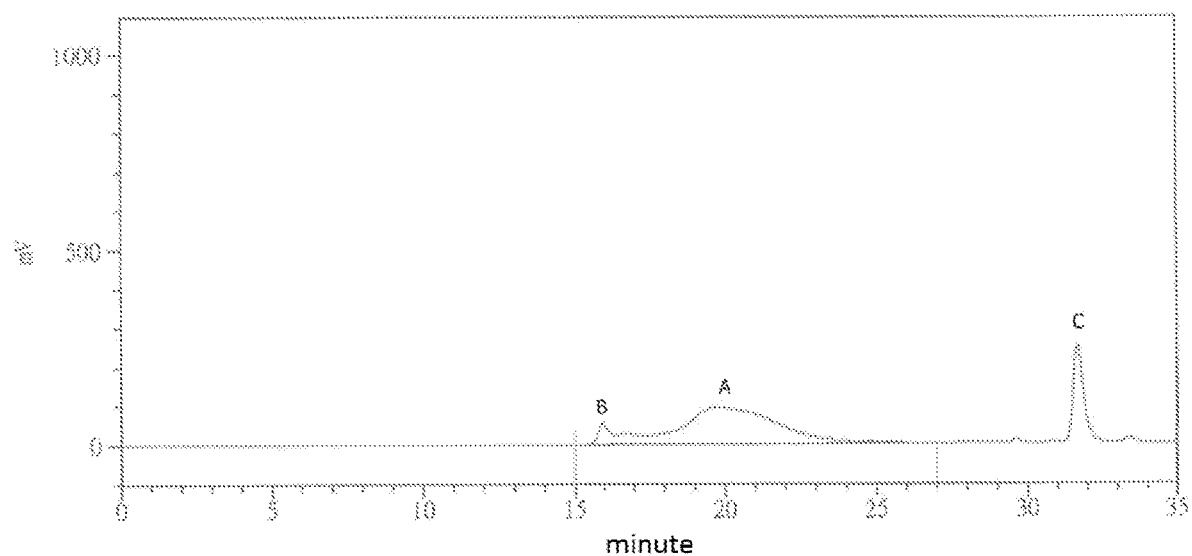

PREPOLYMER, RESIN COMPOSITION COMPRISING THE SAME AND ARTICLE MADE THEREFROM

CROSS-REFERENCE TO RELATED APPLICATION

This application claims the priority benefits of Taiwan Patent Application No. 112107184, filed on Mar. 1, 2023. The entirety of the above-mentioned patent application is hereby incorporated by reference herein and made a part of this specification.

BACKGROUND

1. Field of the Disclosure

The present disclosure pertains to the technical field of polymer materials and more particularly to a prepolymer, a resin composition comprising the prepolymer, and an article made from the resin composition.

2. Description of Related Art

With the rapid advancement of electronic technology, information processing in mobile communication, servers, cloud storage and other electronic products has been incessantly directed toward high frequency signal transmission and high speed digitalization, and low dielectric resin material has become the mainstream for the development of laminates for high frequency and high speed data transmission. The major requirements of resin materials and products thereof such as copper-clad laminates include dielectric properties, thermal resistance, excellent adhesion and dimensional stability. Therefore, there is a need for developing materials suitable for a printed circuit board (PCB) with overall good performances.

SUMMARY

To overcome the problems of prior arts, particularly one or more above-mentioned property demands facing conventional materials, it is a primary object of the present disclosure to provide a prepolymer, a resin composition comprising the prepolymer and an article made from the resin composition, which may achieve at least one desirable property improvement including dielectric constant, dissipation factor, copper foil peeling strength, X-axis coefficient of thermal expansion and glass transition temperature.

To achieve the above-mentioned object, the present disclosure provides a prepolymer obtained from a prepolymerization reaction of a mixture, the mixture at least comprising dicyclopentadiene-ethylidenenorbornene copolymer and acenaphthylene in a weight ratio of between 1:1 and 5:1.

For example, in one embodiment, the prepolymerization reaction is performed in the presence of a reaction initiator at 80° C. to 90° C. for 4 to 6 hours, and the prepolymerization reaction has a conversion rate of between 10% and 90%.

In addition, also disclosed herein is a resin composition, which at least comprises the above-described prepolymer.

For example, in one embodiment, the resin composition comprises 120 parts by weight of the prepolymer and 10 to 30 parts by weight of a vinyl group-containing polyphenylene ether resin.

For example, in one embodiment, the resin composition further comprises inorganic filler, curing accelerator, flame retardant, polymerization inhibitor, solvent, silane coupling agent, coloring agent, toughening agent or a combination thereof.

For example, in one embodiment, a varnish made from the prepolymer and solvent has a shelf life of greater than or equal to 30 days.

For example, in one embodiment, a varnish made from the prepolymer and solvent has a gel time of between 300 seconds and 350 seconds.

Moreover, the present disclosure also provides an article made from the resin composition described above, which comprises a prepreg, a resin film, a laminate or a printed circuit board.

For example, in one embodiment, articles made from the resin composition disclosed herein have one, more or all of the following properties:

- a dielectric constant as measured by reference to JIS C2565 at 10 GHz of less than or equal to 2.99;
- a dissipation factor as measured by reference to JIS C2565 at 10 GHz of less than or equal to 0.00114;
- a copper foil peeling strength as measured by reference to IPC-TM-650 2.4.8 of greater than or equal to 2.2 lb/in;
- an X-axis coefficient of thermal expansion as measured by reference to IPC-TM-650 2.4.24.5 of less than or equal to 7.98 ppm/° C.; and
- a glass transition temperature as measured by reference to IPC-TM-650 2.4.24.4 of greater than or equal to 141° C.

BRIEF DESCRIPTION OF THE DRAWINGS

The sole FIGURE illustrates the GPC spectra of reactants (dicyclopentadiene-ethylidenenorbornene copolymer and acenaphthylene) and product (Prepolymer 1) obtained from Synthesis Example 1.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "contains," "containing," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or FIGURES have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture refers to a combination of two or more compounds.

As used herein, a prepolymer refers to a product, derived from a compound or a mixture (monomer) that is subjected to prepolymerization (partial polymerization), contains unreacted reactive functional groups or has the potential to undergo further polymerization. For example, the progress of the prepolymerization reaction may be confirmed and controlled as needed by determining the molecular weight or the level of viscosity. Prepolymerization reaction disclosed herein may be initiated by the use of solution and heating or by a thermal melting reaction, but not limited thereto. For example, prepolymerization by the use of solution and heating refers to mixing and dissolving the raw materials in a solvent to obtain a solution, optionally adding a catalyst or a polymerization inhibitor in the solution, followed by heating after all components are melted in the solvent, so as to initiate the prepolymerization reaction. Prepolymerization by a thermal melting reaction refers to heating to melt the raw material and at the same time initiate the prepolymerization reaction. The product after prepolymerization (i.e., the prepolymer) has a molecular weight of greater than that of the compound monomer or mixture monomer prior to prepolymerization and may be analyzed by a gel permeation chromatograph (GPC). In the graph of retention time (X-axis) and molecular weight (Y-axis), the distribution peak of molecular weight of the prepolymer is located closer to the Y-axis (shorter retention time), and the distribution peak of molecular weight of the monomer is located behind (longer retention time). In addition, the prepolymer obtained has a wider distribution of molecular weight that contains multiple adjacent peaks, while the monomer has a narrower distribution of molecular weight that contains only one peak.

For example, according to the present disclosure, the prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured.

To those of ordinary skill in the art to which this disclosure pertains, a resin composition containing an additive and three compounds (e.g., A, B and C), a total of four components, is different form a resin composition containing the additive and a prepolymer formed by the three compounds (e.g., A, B and C), a total of two components, as they are completely different from each other in the aspects of preparation method, physical or chemical properties of the resin composition and properties of an article or product made therefrom. For example, the former involves mixing A, B, C and the additive to form the resin composition; in contrast, the latter involves first subjecting a mixture comprising A, B and C to a prepolymerization reaction at proper conditions to form a prepolymer and then mixing the prepolymer with the additive to form the resin composition. For example, to those of ordinary skill in the art to which this disclosure pertains, the two resin compositions have completely different compositions; in addition, because the prepolymer formed by A, B and C functions completely different from A, B and C individually or collectively in the resin composition, the two resin compositions should be construed as completely different chemical substances and have completely different chemical statuses. For example, to those of ordinary skill in the art to which this disclosure pertains, because the two resin compositions are completely different chemical substances, articles made therefrom will not have the same properties. For example, to a resin composition containing a crosslinking agent and a prepolymer formed by A, B and C, since A, B and C have been partially reacted or converted during the prepolymerization reaction to form the prepolymer, during the process of heating to semi-cure the resin composition at a high temperature condition, a partial crosslinking reaction occurs between the prepolymer and the crosslinking agent but not between A, B and C individually and the crosslinking agent. As such, articles made from the two resin compositions will be completely different and have completely different properties.

Unless otherwise specified, the term "resin" is a widely used common name of a synthetic polymer and is construed in the present disclosure as comprising monomer and its combination, polymer and its combination or a combination of monomer and its polymer, but not limited thereto.

As used herein, "vinyl" or "vinyl group-containing" refers to the presence of an ethylenic carbon-carbon double bond (C=C) or a functional group derived therefrom in a compound. Therefore, examples of "vinyl" or "vinyl group-containing" may include, but not limited to, a structure containing a vinyl group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl group-containing polyphenylene ether resin represents a polyphenylene ether resin containing a vinyl group, an allyl group, a vinylbenzyl group, a methacrylate group or the like, but not limited thereto.

Unless otherwise specified, according to the present disclosure, a polymer refers to the product formed by monomer (s) via polymerization and usually comprises multiple aggregates of polymers respectively formed by multiple repeated simple structure units by covalent bonds; the monomer refers to the compound forming the polymer. A polymer may comprise a homopolymer, a copolymer, an oligomer, etc., but not limited thereto. Unless otherwise specified, according to the present disclosure, the homopolymer refers to a polymer formed by polymerizing one kind of monomer. Unless otherwise specified, according to the present disclosure, the copolymer refers to a product formed by subjecting two or more kinds of monomers to a polymerization reaction. For example, copolymers may comprise: random copolymers, such as a structure of -AABABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. The copolymer of the present disclosure may be modified, such as by maleic anhydride. The term "polymer" includes but not limited to an oligomer, which is a polymer with 2-20, typically 2-5, repeating units.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

Unless otherwise specified, an alkyl group and an alkenyl group described herein are construed to encompass various isomers thereof. For example, a propyl group is construed to encompass n-propyl and iso-propyl.

As used herein, part(s) by weight represents weight part(s) in any weight unit, such as but not limited to kilogram, gram, pound and so on. For example, 100 parts by weight of the prepolymer may represent 100 kilograms of the prepolymer or 100 pounds of the prepolymer. As used herein, if the amounts of components are presented in a proportional relationship, the actual parts by weight can be any amount that conforms to the proportional relationship. For example, dicyclopentadiene-ethylidenenorbornene copolymer and acenaphthylene have a weight ratio of between 1:1 and 5:1, representing the actual amount may be 100 parts by weight of dicyclopentadiene-ethylidenenorbornene copolymer in combination with 100 parts by weight of acenaphthylene or may be 500 parts by weight of dicyclopentadiene-ethylidenenorbornene copolymer in combination with 100 parts by weight of acenaphthylene, but not limited thereto.

The following embodiments and examples are illustrative in nature and are not intended to limit the present disclosure and its application. In addition, the present disclosure is not bound by any theory described in the background and summary above or the following embodiments or examples.

As described above, a main object of the present disclosure is to provide a prepolymer, which is obtained from a prepolymerization reaction of a mixture, the mixture at least comprising dicyclopentadiene-ethylidenenorbornene copolymer and acenaphthylene in a weight ratio of between 1:1 and 5:1.

The conditions of the prepolymerization reaction are not particularly limited and may be adjusted by those skilled in the art without undue experimentation. For example, in one embodiment, the prepolymerization reaction is performed in the presence of a reaction initiator at 80° C. to 90° C. for 4 to 6 hours, and the prepolymerization reaction has a conversion rate of between 10% and 90%.

For example, unless otherwise specified, dicyclopentadiene-ethylidene norbornene copolymer refers to a copolymer obtained by polymerizing dicyclopentadiene and ethylidenenorbornene or a copolymer obtained by further adding a proper amount of catalyst to a copolymer obtained by polymerizing dicyclopentadiene and ethylidenenorbornene and conducting the reaction, wherein the ethylidenenorbornene may include various isomers. Unless otherwise specified, the dicyclopentadiene-ethylidenenorbornene copolymer may be available from commercial products, such as PCX01, PCX02, PCX03 or PCX04, available from Demeta, but not limited thereto.

For example, in one embodiment, the reaction initiator may be dibenzoyl peroxide, dicumyl peroxide, 2,5-dimethyl-2,5-di(t-butylperoxy)hexane, 2,5-dimethyl-2,5-di(t-butylperoxy)-3-hexyne, di-t-butyl peroxide, di(t-butylperoxy isopropyl)benzene, di(t-butylperoxy)phthalate, di(t-butylperoxy)isophthalate, t-butyl peroxybenzoate, 2,2-di(t-butylperoxy)butane, 2,2-di(t-butylperoxy)octane, 2,5-dimethyl-2,5-di(benzoylperoxy)hexane, lauroyl peroxide, t-hexyl peroxypivalate, dibutylperoxyisopropylbenzene and bis(4-t-butylcyclohexyl) peroxydicarbonate, but not limited thereto.

For example, in one embodiment, the prepolymerization reaction of the dicyclopentadiene-ethylidenenorbornene copolymer and acenaphthylene disclosed herein refers to a conversion rate of dicyclopentadiene-ethylidenenorbornene copolymer as monomer or acenaphthylene as monomer of greater than 0% and less than 100% (exclusive of 0% and 100%), such as but not limited to a conversion rate of between 10% and 90% (inclusive of 10% and 90%). Existence of some unreacted (e.g., not converted) monomers may increase the compatibility and crosslinking degree of the prepolymer in the resin composition. Specifically, a 0% conversion rate of the monomer represents no reaction of the monomer and therefore fails to form the product from the prepolymerization reaction of dicyclopentadiene-ethylidenenorbornene copolymer and acenaphthylene. Similarly, a 100% conversion rate of the monomer represents complete reaction of the monomer and therefore also fails to form the product from the prepolymerization reaction of dicyclopentadiene-ethylidenenorbornene copolymer and acenaphthylene.

According to the present disclosure, after the prepolymerization reaction is completed, the reactant still contains some residual reactive vinyl groups, and therefore the prepolymer of the present disclosure has the potential of crosslinking in a resin composition with other components.

According to the present disclosure, the mixture at least comprises dicyclopentadiene-ethylidenenorbornene copolymer and acenaphthylene. For example, the mixture may include dicyclopentadiene-ethylidenenorbornene copolymer and acenaphthylene as the reactants of a prepolymerization reaction or may include dicyclopentadiene-ethylidenenorbornene copolymer, acenaphthylene and other components as the reactants of a prepolymerization reaction. For example, examples of other components include but are not limited to unsaturated C=C double bond-containing monomers, such as bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate, or a combination thereof.

When the prepolymerization reaction was performed to prepare the prepolymer of the present disclosure, the weight ratio of dicyclopentadiene-ethylidenenorbornene copolymer to acenaphthylene is between 1:1 and 5:1. For example, the weight ratio of dicyclopentadiene-ethylidenenorbornene copolymer to acenaphthylene may be 1:1, 2:1, 3:1, 4:1 or 5:1. In other words, if the amount of dicyclopentadiene-ethylidenenorbornene copolymer is 100 parts by weight in the aforesaid mixture, the amount of acenaphthylene may be 20 to 100 parts by weight, such as but not limited to 20, 30, 40, 50, 60, 70, 80, 90 or 100 parts by weight. In one embodiment, in addition to dicyclopentadiene-ethylidenenorbornene copolymer and acenaphthylene, if the aforesaid mixture includes one or more other components as the reactants for the prepolymerization reaction, the amount of the aforementioned one or more other components may be 1 to 15 parts by weight relative to 100 parts by weight of dicyclopentadiene-ethylene norbornene copolymer, such as but not limited to 1, 2, 3, 4, 5, 6, 7, 8, 9, 10, 11, 12, 13, 14 or 15 parts by weight.

On the other hand, also disclosed herein is a resin composition, comprising the above-described prepolymer.

For example, in one embodiment, the resin composition disclosed herein may comprise the prepolymer and one or more additives.

For example, in one embodiment, the additive may include various components used in the art for preparing printed circuit board materials, such as but not limited to a vinyl group-containing polyphenylene ether resin, a polyolefin, a maleimide resin, an epoxy resin, a cyanate ester resin, a phenolic resin, a styrene maleic anhydride, a polyester resin, a polyamide resin, a polyimide resin, or a combination thereof. The amount of the additive is not particularly limited and may be adjusted according to the need. For example, in one embodiment, the resin composition of the present disclosure comprises 120 parts by weight of a prepolymer and 2 to 42 parts by weight of an additive. For example, in one embodiment, the resin composition of the present disclosure comprises 120 parts by weight of a prepolymer and 10 to 30 parts by weight of a vinyl group-containing polyphenylene ether resin.

Unless otherwise specified, the vinyl group-containing polyphenylene ether resin described in various embodiments may comprise various polyphenylene ether resins with terminals modified by a vinyl group, an allyl group, or a (meth)acrylate group, such as a vinylbenzyl group-containing biphenyl polyphenylene ether resin, a methacrylate group-containing polyphenylene ether resin, a vinylbenzyl group-containing bisphenol A polyphenylene ether resin, a chain-extended vinyl group-containing polyphenylene ether resin or a combination thereof, but not limited thereto.

For example, in one embodiment, the vinyl group-containing polyphenylene ether resin may comprise various vinyl group-containing polyphenylene ether resins known in the art to which this disclosure pertains. The vinyl group-containing polyphenylene ether resin suitable for the present disclosure is not particularly limited and may comprise any one or more commercially available products, self-prepared products, or a combination thereof. In some embodiments, examples of the vinyl group-containing polyphenylene ether resin include: vinylbenzyl group-containing biphenyl polyphenylene ether resin (e.g., OPE-2st available from Mitsubishi Gas Chemical Co., Inc.), methacrylate group-containing polyphenylene ether resin (e.g., SA9000 available from Sabic), vinylbenzyl group-containing bisphenol A polyphenylene ether resin, chain-extended vinyl group-containing polyphenylene ether resin or a combination thereof. The chain-extended vinyl group-containing polyphenylene ether resin may include various polyphenylene ether resins disclosed in the US Patent Application Publication No. 2016/0185904 A1, all of which are incorporated herein by reference in their entirety.

For example, in one embodiment, the polyolefin described in various embodiments comprises, but not limited to, styrene-butadiene-divinylbenzene terpolymer, styrene-butadiene-maleic anhydride terpolymer, vinyl-polybutadiene-urethane oligomer, styrene-butadiene copolymer (such as but not limited to styrene-butadiene-styrene copolymer), styrene-isoprene copolymer, maleic anhydride-butadiene copolymer, polybutadiene (i.e., homopolymer of butadiene), ethylene-propylene-(5-ethylidene-2-norbornene) terpolymer, or a combination thereof. For example, in one embodiment, the resin composition of the present disclosure comprises 120 parts by weight of a prepolymer and 20 to 40 parts by weight of a polyolefin.

In addition to the aforesaid components, the resin composition may also optionally comprise: inorganic filler, curing accelerator, flame retardant, polymerization inhibitor, solvent, silane coupling agent, coloring agent, toughening agent or a combination thereof, but not limited thereto.

For example, the inorganic filler may be any one or more inorganic fillers used for preparing a prepreg, a resin film, a laminate or a printed circuit board; examples of the inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and calcined kaolin. Moreover, the inorganic filler can be spherical, fibrous, plate-like, particulate, flake-like or whisker-like in shape and can be optionally pretreated by a silane coupling agent. Unless otherwise specified, the amount of the inorganic filler described above is not particularly limited and may for example range from 30 parts by weight to 300 parts by weight of the inorganic filler relative to 120 parts by weight of the prepolymer, preferably range from 80 parts by weight to 140 parts by weight of the inorganic filler relative to 120 parts by weight of the prepolymer.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2 MI), 2-phenyl-1H-imidazole (2PZ), 2-ethyl-4-methyl imidazole (2E4 MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxy isopropyl)benzene or a combination thereof. Unless otherwise specified, the amount of the curing accelerator described above is not particularly limited and may for example range from 0.1 part by weight to 2 parts by weight of the curing accelerator relative to 120 parts by weight of the prepolymer, preferably range from 0.5 part by weight to 2 parts by weight of the curing accelerator relative to 120 parts by weight of the prepolymer.

For example, the flame retardant used herein may be any one or more flame retardants useful for preparing a prepreg, a resin film, a laminate or a printed circuit board, examples including but not limited to a phosphorus-containing flame retardant, preferably comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO (9,10-dihydro-9-oxa-10-phosphaphenanthrene-10-oxide) and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), or a combination thereof.

For example, the flame retardant may be a DPPO compound (e.g., di-DPPO compound, such as commercially available PQ-60), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac). Unless otherwise specified, the amount of the aforesaid flame retardant is not particularly limited.

For example, the polymerization inhibitor may comprise, but not limited to, 1,1-diphenyl-2-picrylhydrazyl radical, methyl acrylonitrile, 2,2,6,6-tetramethyl-1-oxo-piperidine, dithioester, nitroxide-mediated radical, triphenylmethyl radical, metal ion radical, sulfur radical, hydroquinone, 4-methoxyphenol, p-benzoquinone, phenothiazine, ß-phenylnaphthylamine, 4-t-butylcatechol, methylene blue, 4,4'-butylidenebis(6-t-butyl-3-methylphenol), 2,2'-methylenebis(4-ethyl-6-t-butyl phenol) or a combination thereof. For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxopiperidine 1-oxyl free radical, 2,2,5,5-tetramethyl pyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

For example, the solvent is not particularly limited and may be any solvent suitable for dissolving the resin composition disclosed herein, example including, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof. The amount of solvent is not particularly limited and may be adjusted according to the viscosity required for the resin composition.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane. The amount of silane coupling agent is not particularly limited and may be adjusted according to the dispersivity of inorganic filler used in the resin composition.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof.

The resin composition of various embodiments may be processed to make different articles, such as those suitable for use as components in electronic products, including but not limited to a prepreg, a resin film, a laminate or a printed circuit board.

For example, the resin compositions of various embodiments may be used to make prepregs.

For example, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 100° C. to 140° C. The reinforcement material may be a fiber material or a non-fiber material, configured as any one of woven fabric and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, by well mixing the resin composition to form a varnish, loading the varnish into an impregnation tank, impregnating a fiberglass fabric into the impregnation tank to adhere the resin composition onto the fiberglass fabric, and finally heating and baking the resin composition at a proper temperature to a semi-cured state, a prepreg may be obtained.

For example, the article made from the resin composition disclosed herein may be a resin film.

For example, in one embodiment, the resin film disclosed herein is prepared by heating and baking the resin composition to the semi-cured state (B-stage). For example, the resin composition may be selectively coated on a liquid crystal polymer film, a polyethylene terephthalate film (PET film) or a polyimide film; for example, the resin composition from each embodiment may be coated on a copper foil to uniformly adhere the resin composition thereon, followed by heating and baking to a semi-cured state to form a resin film, so as to obtain a copper-clad resin film (i.e., resin-coated copper).

For example, the resin compositions of various embodiments may be used to make laminates.

For example, in one embodiment, the laminate of the present disclosure comprises at least two metal foils and an insulation layer disposed between the metal foils, wherein the insulation layer is made by curing the resin composition at high temperature and high pressure to the C-stage, a suitable curing temperature being for example between 180° C. and 240° C. and preferably between 200° C. and 220° C. and a suitable curing time being 60 to 150 minutes and preferably 90 to 120 minutes. The insulation layer may be formed by curing the aforesaid prepreg or resin film to the C-stage. The metal foil may comprise copper, aluminum, nickel, platinum, silver, gold or alloy thereof, such as a copper foil. In one embodiment, the laminate is a copper-clad laminate (CCL).

In addition, the laminate may be further processed by trace formation processes to make a circuit board, such as a printed circuit board.

In one embodiment of making the printed circuit board according to the present disclosure, a double-sided copper-clad laminate (such as product EM-891, available from Elite Material Co., Ltd.) with a thickness of 28 mil and having 0.5-ounce (oz) HVLP (hyper very low profile) copper foils may be used and subjected to the following steps: 1. Drilling and then electroplating, so as to form electrical conduction between the top layer copper foil and the bottom layer copper foil; 2. Then the top layer copper foil and the bottom layer copper foil are etched to form inner layer circuits; 3. Then brown oxidation and roughening are performed on the inner layer circuits to form uneven structures on the surface to increase roughness; 4. Next, a vacuum lamination apparatus is used to laminate the assembly of a copper foil, the prepreg, the inner layer circuits, the prepreg and a copper foil stacked in said order by heating at 190° C. to 220° C. for 90 to 200 minutes to cure the insulation material of the prepregs. The number of times to repeat the above steps 1 to 4 is determined according to the need of the terminal product, so as to finally obtain the required printed circuit board.

In one embodiment, the prepolymer disclosed herein, the resin composition containing the prepolymer or an article made therefrom may achieve improvement in one or more of the following properties: varnish shelf life, gel time, dielectric constant, dissipation factor, copper foil peeling strength, X-axis coefficient of thermal expansion and glass transition temperature.

For example, in one embodiment, the prepolymer disclosed herein, the resin composition containing the prepolymer or an article made therefrom has one, more or all of the following properties:

a shelf life of varnish made from the prepolymer and solvent of greater than or equal to 30 days, such as greater than or equal to 30 days, 35 days, 40 days, 45 days, 50 days, 55 days, 60 days, 90 days or 120 days, such as a varnish shelf life of between 30 days and 120 days;

a gel time of varnish made from the prepolymer and solvent of between 300 seconds and 350 seconds, such as 300 seconds, 310 seconds, 320 seconds, 330 seconds, 340 seconds or 350 seconds;

a dielectric constant as measured by reference to JIS C2565 at 10 GHz of less than or equal to 2.99, such as between 2.92 and 2.99;

a dissipation factor as measured by reference to JIS C2565 at 10 GHz of less than or equal to 0.00114, such as between 0.00098 and 0.00114;

a copper foil peeling strength as measured by reference to IPC-TM-650 2.4.8 of greater than or equal to 2.2 lb/in, such as between 2.20 lb/in and 2.52 lb/in;

an X-axis coefficient of thermal expansion as measured by reference to IPC-TM-650 2.4.24.5 of less than or equal to 7.98 ppm/° C., such as between 6.98 ppm/° C. and 7.98 ppm/° C.; and a glass transition temperature as measured by reference to IPC-TM-650 2.4.24.4 of greater than or equal to 141° C., such as between 141° C. and 176° C.

Methods for measuring the aforesaid properties will be elaborated in detail below.

Chemical reagents used in Examples and Comparative Examples of resin composition disclosed herein and chemical reagents used in Preparation Examples and Synthesis Examples are listed below:

Prepolymer 1 to Prepolymer 11: as described in Synthesis Example 1 to Synthesis Example 11.

PCX03: dicyclopentadiene-ethylidenenorbornene copolymer, available from Demeta, wherein the dicyclopentadiene content is 94 wt % to 98 wt % and the ethylidenenorbornene content is less than or equal to 6 wt %.

DCPD homopolymer: dicyclopentadiene homopolymer, as described in Preparation Example 1.

DCPD: dicyclopentadiene, available from Sigma-Aldrich.

Acenaphthylene: available from Sigma-Aldrich.

ENB: 5-ethylidene-2-norbornene, available from Sigma-Aldrich.

OPE-2st 2200: vinylbenzyl group-terminated polyphenylene ether resin, available from Mitsubishi Gas Chemical Co., Inc.

SA9000: methacrylate group-terminated polyphenylene ether resin, available from Sabic.

B1000: polybutadiene, available from Nippon Soda Co., Ltd.

EPT™ X-3012P: ethylene-propylene-5-ethylidene-2-norbornene terpolymer, available from Mitsui Chemicals.

SC-2050 SVJ: spherical silica, available from Admatechs.

25B: 2,5-dimethyl-2,5-di(tert-butylperoxy)-3-hexyne, available from NOF Corporation.

Toluene: commercially available.

BPO: dibenzoyl peroxide, available from Sigma-Aldrich.

BVPE: bis(vinylphenyl)ethane, available from Linchuan Chemical Co., Ltd.

Divinylbenzene-styrene-ethylstyrene terpolymer: as described in Preparation Example 2.

PROXIMA® resin: dicyclopentadiene-norbornene copolymer, available from Materia Inc.

PCX04: dicyclopentadiene-ethylidenenorbornene copolymer, available from Demeta, wherein the dicyclopentadiene content is 80 wt % to 85 wt % and the ethylidenenorbornene content is less than or equal to 10 wt %.

Poly-ENB: 5-ethylidene-2-norbornene copolymer, as described in Preparation Example 3, used for the test of varnish shelf life.

Preparation Example 1

100 parts by weight of dicyclopentadiene and 0.05 part by weight of benzylidene[1,3-bis(trimethylphenyl)-2-imidazolidinylidene]dichloro(tricyclohexylphos phine)ruthenium (a second-generation Grubbs catalyst, available from Sigma-Aldrich) were added to a three-necked flask, followed by adding 100 parts by weight of toluene to the three-necked flask, and the reaction was continuously stirred to obtain a mixture solution. The mixture solution was heated from room temperature to 100° C. and continuously stirred for 6 hours, followed by cooled down to room temperature and filtered for removing impurities and part of solvent so as to obtain DCPD homopolymer.

Preparation Example 2

100 parts by weight of toluene solvent, 60 parts by weight of 1,4-divinylbenzene (available from Merck), 30 parts by weight of styrene and 40 parts by weight of 4-ethylstyrene (available from Alfa Chemistry) were added to a three-necked flask and stirred to dissolve completely, followed by adding 2.0 parts by weight of tetrabutylammonium and 1.0 part by weight of stannic chloride. The reaction was performed under stirring at 100° C. for 3 hours. After the reaction was completed, steps including filtration, purification, methanol precipitation and cooling were performed to obtain a solid divinylbenzene-styrene-ethylstyrene terpolymer.

Preparation Example 3

100 parts by weight of 5-ethylidene-2-norbornene and 0.05 part by weight of benzylidene[1,3-bis(trimethylphenyl)-2-imidazolidinylidene]dichloro(tricyclohexylphos phine)ruthenium (a second-generation Grubbs catalyst, available from Sigma-Aldrich) were added to a three-necked flask, followed by adding 100 parts by weight of toluene to the three-necked flask, and the reaction was continuously stirred to obtain a mixture solution. The mixture solution was heated from room temperature to 100° C. and continuously stirred for 6 hours, followed by cooled down to room temperature and filtered for removing impurities and part of solvent so as to obtain Poly-ENB.

Synthesis Example 1

75 parts by weight of PCX03, 45 parts by weight of acenaphthylene and 0.1 part by weight of BPO were added to a three-necked flask, followed by adding 100 parts by weight of toluene to the three-necked flask, and the reaction was continuously stirred to obtain a mixture solution. The mixture solution was heated from room temperature to 85° C. and continuously stirred for 5 hours, followed by cooled down to room temperature and filtered for removing impurities so as to obtain Prepolymer 1 solution with a solid content of about 55%, which is the prepolymer according to the present disclosure.

The Prepolymer 1, dicyclopentadiene-ethylidenenorbornene copolymer (PCX03) and acenaphthylene were analyzed together by gel permeation chromatography (GPC), and the results were shown in the sole FIGURE. From the results of gel permeation chromatography, it can be observed that Prepolymer 1 is washed out first due to its higher molecular weight than dicyclopentadiene-ethylidenenorbornene copolymer or acenaphthylene, so the retention time is the shortest, and the position is Peak B; dicyclopentadiene-ethylidenenorbornene copolymer is washed out next, which is peak A; acenaphthylene is the last one washed out, which is peak C. From the results of the sole FIGURE, it can be observed that subjecting dicyclopentadiene-ethylidene norbornene copolymer and acenaphthylene to the aforesaid prepolymerization reaction may obtain Prepolymer 1 with higher molecular weight, which is the prepolymer according to the present disclosure.

Synthesis Example 2

Substantially the same as Synthesis Example 1, except that 60 parts by weight of PCX03 and 60 parts by weight of acenaphthylene were added to obtain Prepolymer 2 solution after synthesis, which is the prepolymer according to the present disclosure.

Synthesis Example 3

Substantially the same as Synthesis Example 1, except that 100 parts by weight of PCX03 and 20 parts by weight of acenaphthylene were added to obtain Prepolymer 3 solution after synthesis, which is the prepolymer according to the present disclosure.

Synthesis Example 4

75 parts by weight of PCX03, 30 parts by weight of acenaphthylene, 15 parts by weight of BVPE and 0.1 part by weight of BPO were added to a three-necked flask, followed by adding 100 parts by weight of toluene to the three-necked flask, and the reaction was continuously stirred to obtain a mixture solution. The mixture solution was heated from room temperature to 85° C. and continuously stirred for 5 hours, followed by cooled down to room temperature and filtered for removing impurities so as to obtain Prepolymer 4 solution with a solid content of about 55%, which is the prepolymer according to the present disclosure.

Synthesis Example 5

75 parts by weight of DCPD homopolymer, 45 parts by weight of acenaphthylene and 0.1 part by weight of BPO were added to a three-necked flask, followed by adding 100 parts by weight of toluene to the three-necked flask, and the reaction was continuously stirred to obtain a mixture solution. The mixture solution was heated from room temperature to 85° C. and continuously stirred for 5 hours, followed by cooled down to room temperature and filtered for removing impurities so as to obtain Prepolymer 5 solution with a solid content of about 55%.

Synthesis Example 6

Substantially the same as Synthesis Example 1, except that 20 parts by weight of PCX03 and 100 parts by weight of acenaphthylene were added to obtain Prepolymer 6 solution after synthesis.

Synthesis Example 7

Substantially the same as Synthesis Example 1, except that 108 parts by weight of PCX03 and 12 parts by weight of acenaphthylene were added to obtain Prepolymer 7 solution after synthesis.

Synthesis Example 8

75 parts by weight of PCX03, 45 parts by weight of BVPE and 0.1 part by weight of BPO were added to a three-necked flask, followed by adding 100 parts by weight of toluene to the three-necked flask, and the reaction was continuously stirred to obtain a mixture solution. The mixture solution was heated from room temperature to 85° C. and continuously stirred for 5 hours, followed by cooled down to room temperature and filtered for removing impurities so as to obtain Prepolymer 8 solution with a solid content of about 55%.

Synthesis Example 9

75 parts by weight of PCX03, 45 parts by weight of divinylbenzene-styrene-ethylstyrene terpolymer and 0.1 part by weight of BPO were added to a three-necked flask, followed by adding 100 parts by weight of toluene to the three-necked flask, and the reaction was continuously stirred to obtain a mixture solution. The mixture solution was heated from room temperature to 85° C. and continuously stirred for 5 hours, followed by cooled down to room temperature and filtered for removing impurities so as to obtain Prepolymer 9 solution with a solid content of about 55%.

Synthesis Example 10

75 parts by weight of PROXIMA® resin, 45 parts by weight of acenaphthylene and 0.1 part by weight of BPO were added to a three-necked flask, followed by adding 100 parts by weight of toluene to the three-necked flask, and the reaction was continuously stirred to obtain a mixture solution. The mixture solution was heated from room temperature to 85° C. and continuously stirred for 5 hours, followed by cooled down to room temperature and filtered for removing impurities so as to obtain Prepolymer 10 solution with a solid content of about 55%.

Synthesis Example 11

75 parts by weight of PCX04, 45 parts by weight of acenaphthylene and 0.1 part by weight of BPO were added to a three-necked flask, followed by adding 100 parts by weight of toluene to the three-necked flask, and the reaction was continuously stirred to obtain a mixture solution. The mixture solution was heated from room temperature to 85° C. and continuously stirred for 5 hours, followed by cooled down to room temperature and filtered for removing impurities so as to obtain Prepolymer 11 solution with a solid content of about 55%, which is the prepolymer according to the present disclosure.

The raw materials and the amount thereof used in Synthesis Example 1 to Synthesis Example 11 are shown in the following Table 1:

TABLE 1

The raw materials and the amount thereof used in Synthesis Example 1 to Synthesis Example 11 (in part by weight)

| Raw material | PCX03 | PCX04 | acenaphthylene | BPO | BVPE | DCPD homo-polymer | divinyl-benzene-styrene-ethylstyrene terpolymer | PROXIMA® resin |
|---|---|---|---|---|---|---|---|---|
| Synthesis Example 1 | 75 | | 45 | 0.1 | | | | |
| Synthesis Example 2 | 60 | | 60 | 0.1 | | | | |
| Synthesis Example 3 | 100 | | 20 | 0.1 | | | | |
| Synthesis Example 4 | 75 | | 30 | 0.1 | 15 | | | |
| Synthesis Example 5 | | | 45 | 0.1 | | 75 | | |
| Synthesis Example 6 | 20 | | 100 | 0.1 | | | | |
| Synthesis Example 7 | 108 | | 12 | 0.1 | | | | |
| Synthesis Example 8 | 75 | | | 0.1 | 45 | | | |

TABLE 1-continued

The raw materials and the amount thereof used in Synthesis Example 1 to Synthesis Example 11 (in part by weight)

| Raw material | PCX03 | PCX04 | acenaphthylene | BPO | BVPE | DCPD homo-polymer | divinyl-benzene-styrene-ethylstyrene terpolymer | PROXIMA® resin |
|---|---|---|---|---|---|---|---|---|
| Synthesis Example 9 | 75 | | | 0.1 | | | 45 | |
| Synthesis Example 10 | | | 45 | 0.1 | | | | 75 |
| Synthesis Example 11 | | 75 | 45 | 0.1 | | | | |

In addition, the resin compositions of various Examples and Comparative Examples of the present disclosure were prepared respectively according to the amount listed in Table 2 to Table 5 and further fabricated to prepare test samples.

TABLE 2

Resin compositions of Examples (in part by weight) and test results

| Component | Name | E1 | E2 | E3 | E4 | E5 | E6 |
|---|---|---|---|---|---|---|---|
| prepolymer | Prepolymer 1 | 120 | | | | 35 | 120 |
| | Prepolymer 2 | | 120 | | | 25 | |
| | Prepolymer 3 | | | 120 | | 20 | |
| | Prepolymer 4 | | | | 120 | 30 | |
| | Prepolymer 5 | | | | | | |
| | Prepolymer 6 | | | | | | |
| | Prepolymer 7 | | | | | | |
| | Prepolymer 8 | | | | | | |
| | Prepolymer 9 | | | | | | |
| | Prepolymer 10 | | | | | | |
| | Prepolymer 11 | | | | | 10 | |
| polymer | PCX03 | | | | | | |
| | DCPD homopolymer | | | | | | |
| monomer | DCPD | | | | | | |
| | acenaphthylene | | | | | | |
| | ENB | | | | | | |
| vinyl group-containing polyphenylene ether resin | OPE-2st 2200 | | | | | | 2 |
| | SA9000 | | | | | | 8 |
| polyolefin | B1000 | | | | | | |
| | EPT™ X-3012P | | | | | | |
| inorganic filler | SC-2050 SVJ | 100 | 100 | 100 | 100 | 100 | 100 |
| peroxide | 25B | 1 | 1 | 1 | 1 | 1 | 1 |
| solvent | toluene | 125 | 125 | 125 | 125 | 125 | 125 |

| Property | Unit | E1 | E2 | E3 | E4 | E5 | E6 |
|---|---|---|---|---|---|---|---|
| Dk@ 10 GHz | none | 2.95 | 2.97 | 2.94 | 2.94 | 2.95 | 2.96 |
| Df@ 10 GHz | none | 0.00105 | 0.00107 | 0.00103 | 0.00105 | 0.00105 | 0.00111 |
| P/S (Hoz · HVLP4) | lb/in | 2.24 | 2.25 | 2.20 | 2.40 | 2.47 | 2.48 |
| X-CTE | ppm/° C. | 7.55 | 7.63 | 7.51 | 7.45 | 7.65 | 7.48 |
| DMA Tg | ° C. | 150 | 143 | 155 | 158 | 155 | 162 |

TABLE 3

Resin compositions of Examples (in part by weight) and test results

| Component | Name | E7 | E8 | E9 | E10 | E11 | E12 |
|---|---|---|---|---|---|---|---|
| prepolymer | Prepolymer 1 | 120 | 120 | 120 | | 60 | |
| | Prepolymer 2 | | | | | | |
| | Prepolymer 3 | | | | 60 | | |
| | Prepolymer 4 | | | | 60 | | 30 |
| | Prepolymer 5 | | | | | | |

TABLE 3-continued

Resin compositions of Examples (in part by weight) and test results

| | | | | | | | |
|---|---|---|---|---|---|---|---|
| | Prepolymer 6 | | | | | | |
| | Prepolymer 7 | | | | | | |
| | Prepolymer 8 | | | | | | |
| | Prepolymer 9 | | | | | | |
| | Prepolymer 10 | | | | | | |
| | Prepolymer 11 | | | | | 30 | 120 |
| polymer | PCX03 | | | | | | |
| | DCPD homopolymer | | | | | | |
| monomer | DCPD | | | | | | |
| | acenaphthylene | | | | | | |
| | ENB | | | | | | |
| vinyl group-containing polyphenylene ether resin | OPE-2st 2200 | 25 | | | 10 | 20 | |
| | SA9000 | 5 | | | | 2 | |
| polyolefin | B1000 | | 10 | 15 | 20 | | |
| | EPT ™X-3012P | | 30 | 5 | 5 | 20 | |
| inorganic filler | SC-2050 SVJ | 100 | 100 | 100 | 80 | 140 | 100 |
| peroxide | 25B | 1 | 1 | 1 | 0.5 | 2 | 1 |
| solvent | toluene | 125 | 125 | 125 | 100 | 175 | 125 |

| Property | Unit | E7 | E8 | E9 | E10 | E11 | E12 |
|---|---|---|---|---|---|---|---|
| Dk@ 10 GHz | none | 2.99 | 2.92 | 2.94 | 2.95 | 2.98 | 2.96 |
| Df@ 10 GHz | none | 0.00114 | 0.00098 | 0.00099 | 0.00102 | 0.00106 | 0.00107 |
| P/S (Hoz · HVLP4) | lb/in | 2.45 | 2.30 | 2.31 | 2.52 | 2.48 | 2.24 |
| X-CTE | ppm/° C. | 7.41 | 7.98 | 7.75 | 6.98 | 7.40 | 7.61 |
| DMA Tg | ° C. | 176 | 141 | 144 | 168 | 162 | 156 |

TABLE 4

Resin compositions of Comparative Examples (in part by weight) and test results

| Component | Name | C1 | C2 | C3 | C4 | C5 | C6 |
|---|---|---|---|---|---|---|---|
| prepolymer | Prepolymer 1 | | | | | | |
| | Prepolymer 2 | | | | | | |
| | Prepolymer 3 | | | | | | |
| | Prepolymer 4 | | | | | | |
| | Prepolymer 5 | | | | | | 120 |
| | Prepolymer 6 | | | | | | |
| | Prepolymer 7 | | | | | | |
| | Prepolymer 8 | | | | | | |
| | Prepolymer 9 | | | | | | |
| | Prepolymer 10 | | | | | | |
| | Prepolymer 11 | | | | | | |
| polymer | PCX03 | 120 | 75 | | | | |
| | DCPD homopolymer | | | 75 | | | |
| monomer | DCPD | | | | 75 | 60 | |
| | acenaphthylene | | 45 | 45 | 45 | 45 | |
| | ENB | | | | | 15 | |
| vinyl group-containing polyphenylene ether resin | OPE-2st 2200 | | | | | | |
| | SA9000 | | | | | | |
| polyolefin | B1000 | | | | | | |
| | EPT ™X-3012P | | | | | | |
| inorganic filler | SC-2050 SVJ | 100 | 100 | 100 | 100 | 100 | 100 |
| peroxide | 25B | 1 | 1 | 1 | 1 | 1 | 1 |
| solvent | toluene | 125 | 125 | 125 | 125 | 125 | 125 |

| Property | Unit | C1 | C2 | C3 | C4 | C5 | C6 |
|---|---|---|---|---|---|---|---|
| Dk@ 10 GHz | none | 3.05 | 3.02 | 3.05 | 3.12 | 3.15 | 2.99 |
| Df@ 10 GHz | none | 0.00109 | 0.00113 | 0.00117 | 0.00112 | 0.00111 | 0.00115 |
| P/S (Hoz · HVLP4) | lb/in | 1.00 | 1.54 | 1.52 | 1.48 | 1.38 | 1.20 |
| X-CTE | ppm/° C. | 10.05 | 10.89 | 12.56 | 11.24 | 12.74 | 12.35 |
| DMA Tg | ° C. | 151 | 145 | 141 | 137 | 146 | 142 |

TABLE 5

Resin compositions of Comparative Examples (in part by weight) and test results

| Component | Name | C7 | C8 | C9 | C10 | C11 |
|---|---|---|---|---|---|---|
| prepolymer | Prepolymer 1 | | | | | |
| | Prepolymer 2 | | | | | |
| | Prepolymer 3 | | | | | |
| | Prepolymer 4 | | | | | |
| | Prepolymer 5 | | | | | |
| | Prepolymer 6 | 120 | | | | |
| | Prepolymer 7 | | 120 | | | |
| | Prepolymer 8 | | | 120 | | |
| | Prepolymer 9 | | | | 120 | |
| | Prepolymer 10 | | | | | 120 |
| | Prepolymer 11 | | | | | |
| polymer | PCX03 | | | | | |
| | DCPD homopolymer | | | | | |
| monomer | DCPD | | | | | |
| | acenaphthylene | | | | | |
| | ENB | | | | | |
| vinyl group-containing polyphenylene ether resin | OPE-2st 2200 | | | | | |
| | SA9000 | | | | | |
| polyolefin | B1000 | | | | | |
| | EPT ™X-3012P | | | | | |
| inorganic filler | SC-2050 SVJ | 100 | 100 | 100 | 100 | 100 |
| peroxide | 25B | 1 | 1 | 1 | 1 | 1 |
| solvent | toluene | 125 | 125 | 125 | 125 | 125 |

| Property | Unit | C7 | C8 | C9 | C10 | C11 |
|---|---|---|---|---|---|---|
| Dk@ 10 GHz | none | 3.05 | 3.01 | precipitation | 2.97 | 3.04 |
| Df@ 10 GHz | none | 0.00114 | 0.00102 | | 0.00100 | 0.00117 |
| P/S (Hoz · HVLP4) | lb/in | 1.20 | 1.56 | | 1.51 | 1.46 |
| X-CTE | ppm/° C. | 11.30 | 12.76 | | 12.19 | 12.92 |
| DMA Tg | ° C. | 162 | 145 | | 121 | 138 |

Samples (specimens) for the properties measured above were prepared as described below and tested and analyzed under specified conditions below.

1. Prepreg (PP):

Resin composition (in part by weight) from each Example or each Comparative Example was separately added to a stirred tank and well-mixed to form a varnish. Then the varnish was loaded to an impregnation tank, and a fiberglass fabric (e.g., 1035 Q-glass fiber fabric, available from Shin-Etsu) was impregnated into the impregnation tank to adhere the resin composition onto the fiberglass fabric, followed by heating at 100° C. to 140° C. to the semi-cured state (B-stage) to obtain a prepreg, having a resin content of about 80%.

2. Copper-Containing Laminate 1 (Obtained by Laminating Two Prepregs):

Two 0.5 oz hyper very low profile 4 (HVLP4) copper foils and two prepregs obtained from 1035 Q-glass fiber fabrics impregnated with each Example or Comparative Example were prepared, each prepreg having a resin content of about 80%. A copper foil, two prepregs and a copper foil were superimposed in such order and then subjected to a vacuum condition for lamination at 250 psi to 600 psi and 200° C. to 220° C. for 90 minutes to 120 minutes to form each copper-containing laminate 1. Insulation layers were formed by laminating two sheets of prepreg between the two copper foils, and the resin content of the insulation layers is about 80%.

3. Copper-Containing Laminate 2 (Obtained by Laminating Six Prepregs):

Two 0.5 oz hyper very low profile 4 (HVLP4) copper foils and six prepregs obtained from 1035 Q-glass fiber fabrics impregnated with each Example or Comparative Example were prepared, each prepreg having a resin content of about 80%. A copper foil, six prepregs and a copper foil were superimposed in such order and then subjected to a vacuum condition for lamination at 250 psi to 600 psi and 200° C. to 220° C. for 90 minutes to 120 minutes to form each copper-containing laminate 2. Insulation layers were formed by laminating six sheets of prepreg between the two copper foils, and the resin content of the insulation layers is about 80%.

4. Copper-Free Laminate 1 (Obtained by Laminating Two Prepregs):

Each copper-containing laminate 1 made by laminating two prepregs obtained above was etched to remove the copper foils on both sides so as to obtain the copper-free laminate 1 (obtained by laminating two prepregs).

5. Copper-Free Laminate 2 (Obtained by Laminating Six Prepregs):

Each copper-containing laminate 2 made by laminating six prepregs obtained above was etched to remove the copper foils on both sides so as to obtain the copper-free laminate 2 (obtained by laminating six prepregs).

Test items and test methods are described below.

Varnish Shelf Life

The prepolymer prepared in the aforementioned Synthesis Examples, such as Prepolymer 1, Prepolymer 2, Prepolymer 3, Prepolymer 4, Prepolymer 5, Prepolymer 9 or Prepolymer 11, and other resin materials (such as DCPD in combination with acenaphthylene or Poly-ENB in combination with acenaphthylene) were respectively dissolved in solvent to prepare a varnish (such as 120 parts by weight of prepolymer in combination with 100 parts by weight of toluene solvent or 120 parts by weight of other resin materials in combination with 100 parts by weight of toluene solvent). Next, the varnish was well mixed and fully dissolved and stood still at 5° C. for one month (30 days) and observed by naked eyes on the 30th day to determine whether or not the varnish precipitates to form brown solid substance. A designation of "≥1 month" represents no precipitation occurred, indicating a varnish shelf life of greater than or equal to one month, such as a varnish shelf life of one to one-and-a-half months, such as a varnish shelf life of one month to one month and a week. The presence of at least one precipitate of 0.5-5 mm in length within 5 days, usually in brown color, is designated as "≤5 days", representing a varnish shelf life of less than or equal to 5 days. Precipitation of the varnish will cause variation and deterioration in properties of laminates made therefrom. The measurement result of varnish shelf life is shown in Table 6.

Gel Time (SG)

0.2 gram of the varnish sample used in the measurement of varnish shelf life was taken and placed at the center of a 171° C. hot plate for 60 seconds and then smeared as a circle with a diameter of about 1 cm; after the varnish clotted and could be pulled up from the hot plate, the duration was recorded and designated as SG (in second). Generally, a gel time of 300-350 seconds at 171° C. represents better operability. The measurement result of gel time is also shown in Table 6.

dielectric constant of different laminates, and a difference in Dk of greater than or equal to 0.3 represents a substantial difference (i.e., significant technical difficulty) in dielectric constant of different laminates.

Dissipation Factor (Df)

The aforesaid copper-free laminate 1 (obtained by laminating two prepregs) was subjected to the measurement. Each sample was measured by using a microwave dielectrometer (available from AET Corp.) by reference to JIS C2565 at room temperature (about 25° C.) and under 10 GHz frequency. Lower dissipation factor represents better dielectric properties of the sample. Under a 10 GHz frequency, for a Df value of less than 0.0030, a difference in Df of less than 0.0001 represents no substantial difference in dissipation factor in different laminates, and a difference in Df value of greater than or equal to 0.0001 represents a substantial difference (i.e., significant technical difficulty) in dissipation factor in different laminates.

Copper Foil Peeling Strength (0.5 Oz Peeling Strength, 0.5 Oz P/S)

A copper-containing laminate 2 (obtained by laminating six prepregs) was cut into a rectangular sample with a width of 24 mm and a length of 80 mm, which was etched to remove surface copper foil to leave a rectangular copper foil with a width of 3.18 mm and a length of greater than 60 mm, and tested by using a tensile strength tester by reference to IPC-TM-650 2.4.8 at room temperature (about 25° C.) to

TABLE 6

The measurement results of varnish shelf life and gel time

| | constituent (amount, in part by weight) | | | | |
|---|---|---|---|---|---|
| | Prepolymer 1 (120) toluene (100) | Prepolymer 2 (120) toluene (100) | Prepolymer 3 (120) toluene (100) | Prepolymer 4 (120) toluene (100) | Prepolymer 11 (120) toluene (100) |
| varnish shelf life | ≥1 month | ≥1 month | ≥1 month | ≥1 month | ≥1 month |
| gel time (second) | 300 | 338 | 350 | 323 | 305 |

| | constituent (amount, in part by weight) | | | |
|---|---|---|---|---|
| | Prepolymer 5 (120) toluene (100) | Prepolymer 9 (120) toluene (100) | DCPD (75) acenaphthylene (45) toluene (100) | Poly-ENB (75) acenaphthylene (45) toluene (100) |
| varnish shelf life | ≤5 days | ≤5 days | ≤5 days | ≤5 days |
| gel time (second) | 200 | 243 | 252 | 120 |

From the results in Table 6, it can be observed that Prepolymer 1, Prepolymer 2, Prepolymer 3, Prepolymer 4 and Prepolymer 11 may achieve a varnish shelf life of greater than or equal to one month and an ideal gel time; however, Prepolymer 5 and Prepolymer 9 fail to achieve the aforementioned ideal varnish shelf life and gel time.

Dielectric Constant (Dk)

The aforesaid copper-free laminate 1 (obtained by laminating two prepregs) was subjected to the measurement. Each sample was tested by using a microwave dielectrometer (available from AET Corp.) by reference to the method and conditions described in JIS C2565 "Measuring methods for ferrite cores for microwave device" at room temperature (about 25° C.) and 10 GHz for analyzing each sample. Lower dielectric constant represents better dielectric properties of the sample. Under a 10 GHZ frequency, a difference in Dk of less than 0.3 represents no substantial difference in measure the 0.5-ounce (half-ounce) copper foil peeling strength (0.5 oz P/S, in lb/in). In the technical field to which the present disclosure pertains, higher copper foil peeling strength is better. Generally, laminates with a resin content of about 80% having a difference in copper foil peeling strength (0.5-ounce) of greater than or equal to 0.3 lb/in represents a substantial difference (i.e., significant technical difficulty) in copper foil peeling strength in different laminates.

X-Axis Coefficient of Thermal Expansion (X-CTE)

The copper-free laminate 1 (obtained by laminating two prepregs) sample was tested by thermal mechanical analysis (TMA). The copper-free laminate 1 was cut into a sample with a length of 15 mm and a width of 2 mm having a thickness of 8 mil. Each sample was heated from 50° C. to 260° C. at a heating rate of 5° C./minute and then subjected to the measurement of the coefficient of thermal expansion (ppm/° C.) in X-axis in a temperature range (designated as α1) of 40° C. to 125° C. by reference to IPC-TM-650 2.4.24.5. Lower X-axis coefficient of thermal expansion represents a better dimensional change property. A difference in X-axis coefficient of thermal expansion of greater than or equal to 1.0 ppm/° C. represents a substantial difference (i.e., significant technical difficulty) in X-axis coefficient of thermal expansion in different laminates.

Glass Transition Temperature (Tg)

The copper-free laminate 2 (obtained by laminating six prepregs) sample was subjected to the measurement. The glass transition temperature (DMA Tg, in ° C.) of each sample was measured by using a dynamic mechanical analyzer (DMA) by reference to IPC-TM-650 2.4.24.4. Temperature interval during the measurement was set at 50-300° C. with a temperature increase rate of 2° C./minute. In the technical field to which the present disclosure pertains, higher glass transition temperature is better.

The following observations can be made according to the test results above.

If the resin composition, such as Comparative Examples C1-C5, does not contain any prepolymers, but contains a polymer (dicyclopentadiene-ethylidenenorbornene copolymer or DCPD homopolymer) and/or a monomer (DCPD, acenaphthylene or ENB), the article made therefrom will fail to achieve desirable improvement in at least one of the properties including dielectric constant, dissipation factor, copper foil peeling strength, X-axis coefficient of thermal expansion and glass transition temperature.

If the resin composition, such as Comparative Examples C6-C11, does not contain the prepolymer of the present disclosure, but contains other prepolymers, the article made therefrom will fail to achieve desirable improvement in at least one of the properties including dielectric constant, dissipation factor, copper foil peeling strength, X-axis coefficient of thermal expansion and glass transition temperature. In Comparative Example C9, varnish precipitation occurred, so the property measurements thereof cannot be made.

In contrast, the resin composition of the present disclosure, such as Examples E1-E12, can achieve at the same time desirable properties including a dielectric constant of less than or equal to 2.99, a dissipation factor of less than or equal to 0.00114, a copper foil peeling strength of greater than or equal to 2.2 lb/in, an X-axis coefficient of thermal expansion of less than or equal to 7.98 ppm/° C. and a glass transition temperature of greater than or equal to 141° C. Moreover, a varnish made from the prepolymer and solvent has a varnish shelf life of greater than or equal to 30 days, and a varnish made from the prepolymer and solvent has a gel time of between 300 seconds and 350 seconds.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A prepolymer obtained from a prepolymerization reaction of a mixture, the mixture at least comprising dicyclopentadiene-ethylidenenorbornene copolymer and acenaphthylene in a weight ratio of between 1:1 and 5:1.

2. The prepolymer of claim 1, wherein the prepolymerization reaction is performed in the presence of a reaction initiator at 80° C. to 90° C. for 4 to 6 hours, and the prepolymerization reaction has a conversion rate of between 10% and 90%.

3. A resin composition comprising the prepolymer of claim 1.

4. The resin composition of claim 3, comprising 120 parts by weight of the prepolymer and 10 to 30 parts by weight of a vinyl group-containing polyphenylene ether resin.

5. The resin composition of claim 3, further comprising inorganic filler, curing accelerator, flame retardant, polymerization inhibitor, solvent, silane coupling agent, coloring agent, toughening agent or a combination thereof.

6. An article made from the resin composition of claim 3, comprising a prepreg, a resin film, a laminate or a printed circuit board.

7. The article of claim 6, having a copper foil peeling strength as measured by reference to IPC-TM-650 2.4.8 of greater than or equal to 2.2 lb/in.

8. The article of claim 6, having an X-axis coefficient of thermal expansion as measured by reference to IPC-TM-650 2.4.24.5 of less than or equal to 7.98 ppm/° C.

* * * * *